UNITED STATES PATENT OFFICE.

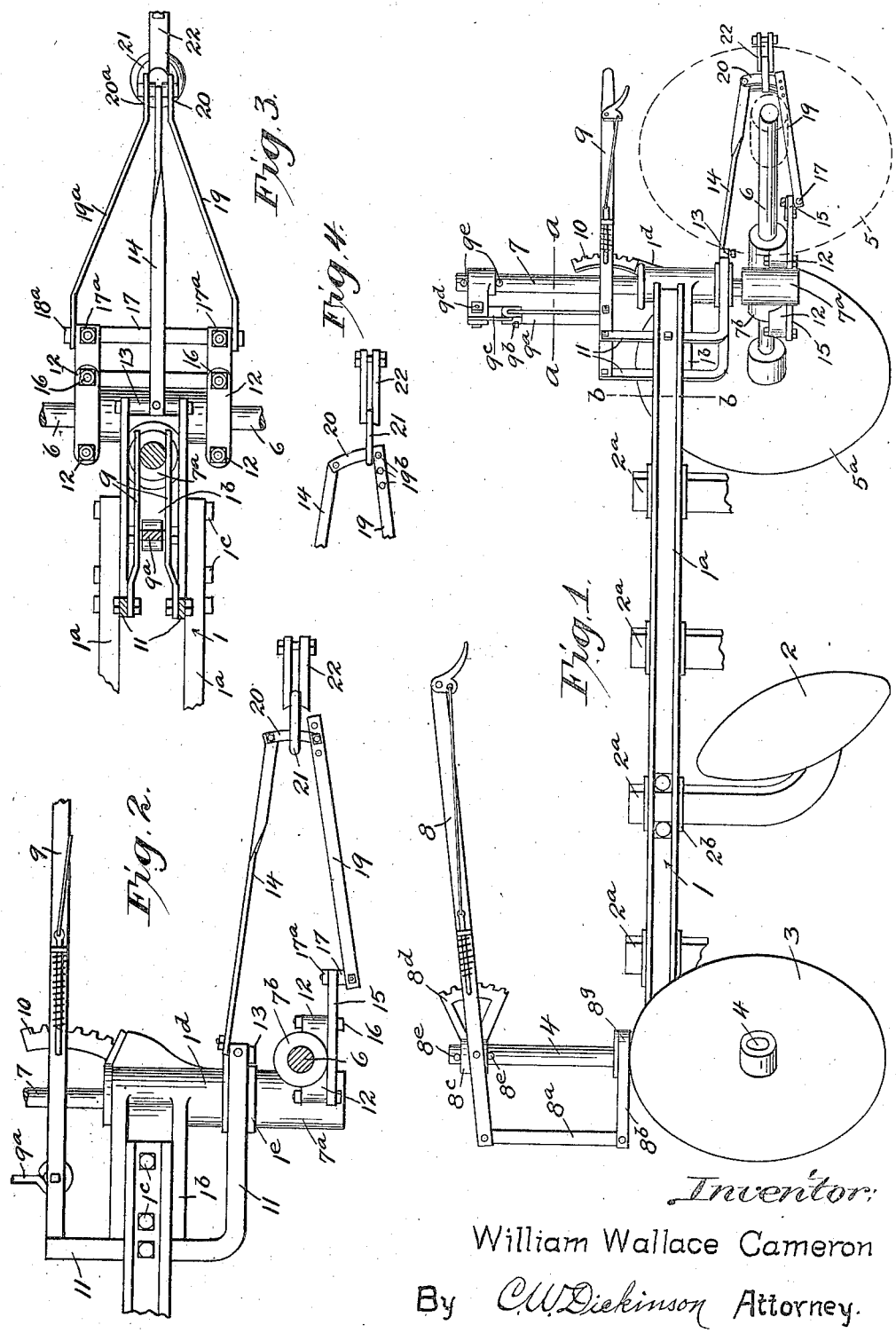

WILLIAM WALLACE CAMERON, OF LA CROSSE, WISCONSIN, ASSIGNOR TO LA CROSSE PLOW COMPANY, OF LA CROSSE, WISCONSIN.

PLOW.

1,301,540.  Specification of Letters Patent.  Patented Apr. 22, 1919.

Application filed September 6, 1917. Serial No. 189,967.

*To all whom it may concern:*

Be it known that I, WILLIAM WALLACE CAMERON, a citizen of the United States of America, whose residence and post-office address is 1008 Rose street, in the city of La Crosse, county of La Crosse, and State of Wisconsin, have invented new and useful Improvements in Plows, of which the following is a true specification, reference being had to the accompanying drawings.

The invention has reference to plows.

The object of the invention is to furnish a plow having a draft device that without the aid of a plowman will adjust itself to vertically shifting lines of draft, and particularly to such structures as have a supporting base structure and a shiftable upper structure, whereby the pull of the draft means will be upon the upper and lower structures directly and adjust itself to changing conditions of draft resistance due to the vertical shift of the upper structure with respect to the sustaining structure.

Another object of the invention is to provide a draft device on plows that may be applicable to a wide variety of such structures when drawn by tractor engines and the like, and that shall be simple in construction and operation.

The invention is designed more particularly to be used with plows of the wheeled type in which such a supporting structure is located toward the front end of the machine, the forward end of the structure for carrying the furrow openers being sustained thereon and vertically shiftable with relation thereto to adjust the openers to their work in the ground and to raise them out of the ground. In plows there is a true vertical center of draft or line between the upper and lower resistances of the furrow opening element, varying according to the depth of the furrow being cut, and the elevation of the pulling element, which may be the attachment of tugs to the collar on the horse or the draw bar of a tractor engine. If the pull of the draft means is above the true line of draft at a given depth of cut the tendency is to drive the opener deeper, or if sustaining wheels prevent that, then to bear downwardly with undue strain. If below the true line of draft the tendency is to raise the opener above the required depth of cut. It has been the practice to furnish means for vertically changing the attachment of the draw bars constituting the draft means so as to bring the pull into the true line of draft and to attach this regulating means directly to the furrow opening structure; or to attach the pulling means, in such a machine as is above described, to the sustaining structure, and find the true line of draft by shifting the furrow carrying structure bodily by means provided. In either case, the correction of the fault requires a hand operation on the part of the plowman, and in either case whichever structure to which the pull is applied is compelled to bodily draw the other structure, with considerable undesirable strain upon the connection between the two, and inequality of draft between the two. If the carrying structure is raised to carry the openers entirely above the ground, as for transportation from place to place, this inequality of strain of one element upon the other is enhanced to some degree. My invention is calculated to overcome all these objections to the common practice, and to furnish a draft means that without attention on the part of the operator will adjust itself to the changing conditions. Other advantages of the improved device will appear during the description of the invention.

In the drawings, Figure 1 shows a side elevation of a plowing structure embodying my invention, the forward portion being angled with respect to the portion that carries the openers, bringing the forward portion of the structure into a perspective view. One of the carrying wheels at the front, and a portion of the axle upon which it is mounted are shown in dotted lines for the sake of clearness. Fig. 2 is a detail of the front end of the structure on an enlarged scale taken forwardly of the line *b—b* of Fig. 1, the upper portion of the sustaining mechanism being cut away on the line *a—a* of Fig. 1, and is shown in elevation instead of perspective. Fig. 3 is a plan of the detail shown in Fig. 2, a portion of the lifting lever and the locking ratchet being cut away. Fig. 4 is a detail of the front end of the device. Figs. 1, 2, 3 and 4 show the draft mechanism in position when draft is applied.

1 indicates a plow beam made of two parallel bars $1^a$—$1^a$, spaced apart at their forward ends by the block $1^b$ to which they are rigidly held by the bolts $1^c$. The forward end of the block $1^b$ carries the vertical bearing 1$^d$. Between the beam bars 1$^a$—1$^a$, at regular intervals are tightly secured shanks 2$^a$ that support furrow openers 2, the shanks being secured to the plow beam by the bolts 2$^b$. Only one of the openers are shown in full. 3 is a rear sustaining wheel for the rear end of the furrow carrying structure, mounted on the rear axle 4; 5 and 5$^a$ are front sustaining wheels mounted on the axle 6 of the front truck, which is connected with the horizontal bearing block 7$^b$, rigidly secured to the vertical supporting block 7$^a$, in which is firmly seated the lower end of the swivel post 7.

The vertical portion of the rear axle 4 swivels in the bearing block 8$^g$ rigidly secured to the rear of the carrying structure. A lifting mechanism is provided for vertically shifting the rear end of the carrying structure comprising the lever 8, pivotally mounted at 8$^c$ on the swiveled bearing block 8$^d$ at the top of the axle 4 and held thereon by the pins 8$^e$ and 8$^e$, which permit rotative movement of the block. On the block 8$^d$ is formed a ratchet, by means of which the lever is locked in adjusted positions. The free end of the lever is pivotally connected to the upper end of a strap 8$^a$, the lower end whereof is pivotally connected to a bar 8$^b$, which is rigidly held in the top of the bearing 8$^g$ in a manner to permit of turning thereabout.

The forward end of the carrying structure is provided with a lifting mechanism comprising the lever 9 pivotally sustained upon the post 7 by means of the straps and links 9$^a$, 9$^b$, 9$^c$ and the swivel bracket 9$^d$, the latter being loosely held upon the axle 7 by the pins 9$^e$. The lever 9 is divided into two parts to pass the post 7 on each side. Strap 9$^a$ is loosely connected to the lever 9 between its side bars, as shown in Figs. 2 and 3 so that it may turn somewhat horizontally to accommodate itself to the turning of the truck or supporting structure. A locking ratchet 10 for the lever 9 is formed on the block 1$^d$. The free ends of the lever 9 are connected to the upper ends of a pair of straps 11—11 projecting upwardly from the rear of the block 1$^b$. Intermediate the ends of the vertical portions of the straps 11—11 they are secured to the beams 1$^a$—1$^a$ respectively to make them rigid therewith. Below the beams the straps are angled to project forwardly, finding a seat in the sides of the bearing 1$^d$ of the block 1$^b$, as shown in Figs. 1 and 2, and continuing forward beyond the bearing 1$^b$ upon the respective sides thereof. Between the forward ends of the straps 11—11 is pivoted a cross bar 13, to which is loosely pivoted a longitudinally arranged draft bar 14 to permit of some lost motion necessary as the supporting structure is turned with respect to the carrying structure; the forward end of the bar 14 is pivoted between and to the upper ends of a pair of vertical curved bars 20—20$^a$.

Formed at the front and rear of the ends of the block 7$^b$ are lugs 12, to the under sides of which and of the bearing 7$^b$ at its respective ends, by means of bolts 16, are secured straps 15 which project forwardly, forming a rigid support for a cross bar 17, which has down turned ends, as shown in Figs. 1 and 2. To the down turned ends are pivoted the rear ends of draft bars 19 and 19$^a$, which project anglingly forward and are pivotally connected to the lower ends of the bars 20—20$^a$ respectively. Encircling both of the vertical bars 20—20$^a$ is a ring or link 21, in the forward portion of which is loosely fitted to a draft clevis 22, for attachment to the draft bar of a tractor engine, or to an evener bar. The pivotal arrangement of the bars 20—20$^a$ and of the draft bars 14 and 19—19$^a$ is such that they are self sustaining, while permitting the necessary freedom of adjustment.

There are, however, conditions under which it is desirable to have the pull of the draft more upon the upper or the lower member than in the true line of draft, and to secure means for producing this result, I have placed a series of holes 19$^b$ in the forward ends of the bars 19 and 19$^a$, to any one of which the vertical bars 20—20$^a$ may be attached. If in the central holes the bars 20—20$^a$ will stand substantially vertically, and the ring 21 will automatically pass to the center thereof in the line of draft. If the adjustment be made to the forward hole, the pull will automatically draw the ring to the lower end of the bars 20—20$^a$ adjacent the draft bars 19—19$^a$, as shown in Fig. 4, with the result that more strain will be thrown upon the upper bar than upon the lower bars, with a tendency to pull the machine upwardly; while if the adjustment is made to the rear hole, the ring will automatically slide upwardly into the angle formed between the upper end of the bar 20 and the draft bar 14, when there will be more strain downwardly upon the draft bar 19—19$^a$ with a tendency to pull the machine downwardly—in either case out of the true line of draft.

The wheels 5 and 5$^a$, the axle 6 and post 7 and its connections with the lever 9 form a sustaining structure for carrying the front end of the furrow opener carrying structure comprising the beams 1$^a$—1$^a$, the block 1$^b$ and the straps 11—11, together with the shanks 2$^a$, etc., while the lever 9 forms a shifting connection between the two structures. It is manifest that as the lever 9 is shifted to raise the carrying structure, the rear end of the draft bar 14 will be shifted accordingly, and that in all the shifted positions of the carrying structure this draft bar will be directly pulling its share of the load, when the bar 20 is in vertical position and that draft bars 19—19ᵃ will be pulling directly upon the supporting structure, and that the draft bars 14 and 19—19ᵃ will mutually and automatically adjust themselves to the shifted positions of the carrying structure. It is equally clear that the draft ring 21 and the clevis 22, owing to the loose attachment of the ring behind the upright curved bars 20—20ᵃ will when draft is applied slide vertically to a neutral point between the pull upon the bar 14 and the bars 19—19ᵃ, which point will be the true line of draft, or to a position above or below the neutral point, according to the adjustment made, and that this movement will be automatic and without the intervention of any effort upon the part of the plow man. The upright bars 20—20ᵃ are located directly in front of the transverse or horizontal line of draft, and owing to the attachment of the rear ends of the bars 19—19ᵃ upon the opposite ends of the block 7ᵇ the horizontal center of draft will be constantly maintained.

While I have shown and described one particular mode of embodying my invention in a physical structure, wide departures from the structure shown might be made without departing from the spirit of the invention.

Having shown and described my invention, what I claim is:

1. In a plow, the combination of a frame, with a pair of vertically spaced longitudinally arranged draft bars, means for attaching the rear ends of the bars to the front of the frame at vertically spaced points, a draft link, and means for loosely connecting the forward ends of the draft bars with the link for free vertical self adjustment of the latter with respect to the ends of the draft bars when draft is applied.

2. In a plow, the combination of a frame, with a pair of vertically spaced longitudinally arranged draft bars, means for attaching the rear ends of the bars with the front of the frame at vertically spaced points, means for vertically shifting the rear end of one of the bars while attached to the frame, a draft link, and means for loosely connecting the link to the forward ends of the bars for vertical adjustment with respect thereto.

3. In a plow, the combination with a frame, of a pair of vertically spaced longitudinally arranged draft bars, means for attaching the rear ends of the bars to the front of the frame at vertically spaced points, means for connecting the forward ends of the bars comprising a vertical bar, a draft link, and means for loosely connecting the link with the vertical bar for free vertical self adjustment with respect thereto when the draft is applied.

4. In a plow, the combination of a frame, with a pair of vertically spaced longitudinally arranged draft bars, means for attaching the rear ends of the bars to the front of the frame at vertically spaced points, means for connecting the forward ends of the draft bars comprising a vertical bar, and a draft link loosely encircling the vertical bar for free vertical shift with respect thereto operated by the draft when applied.

5. In a plow, the combination of a frame, with a pair of vertically spaced longitudinally arranged draft bars, means for connecting the rear ends of the bars respectively to the frame at vertically spaced points, a vertical bar curved forwardly intermediate its ends, connections between the forward ends of the draft bars and the respective ends of the curved bar, and a link loosely encircling the curved bar and adapted to automatically shift vertically when draft is applied.

6. In a plow, the combination of a frame, with a pair of vertically spaced longitudinally arranged draft bars, pivotal connections between the rear ends of the respective bars with the frame at vertically spaced points, and arranged for vertical swing of the bars, a vertical bar curved forwardly intermediate its ends, connections between the forward ends of the draft bars and the respective ends of the curved bar, and a link loosely encircling the curved bar and adapted to vertically and automatically shift with respect to the curved bar when draft is applied.

7. In a plow, the combination of a frame, with a pair of vertically spaced longitudinally arranged draft bars, pivotal connections between the rear ends of the respective bars with the frame at vertically spaced points whereby the bars may swing vertically, a pivotal connection between the forward ends of the bars, a draft link loosely connected with the forward ends of the bars and adapted to vertically shift with respect to the forward ends of the bars, and means for vertically shifting the connection of one of the bars with the frame.

8. In a plow, the combination of a frame, with a draft bar pivoted to the frame for vertical and lateral swing, a draft bar pivoted to the frame at a point vertically spaced from the first pivot and adapted to move vertically and horizontally at its free end, means for shifting the space between the pivot points, one of said pivot points being longitudinally in advance of the other, a connection between the front ends of the two draft bars, and a link loosely connected with the front ends of the bars and adapted to vertically shift when the pivot points on the frame are vertically adjusted while the draft is applied.

9. In a plow, the combination of a frame, comprising a supporting structure, a carrying structure, and a connection between the structures for shifting the carrying structure vertically with respect to the supporting structure, with draft bars pivotally connected to the respective structures, pivotal connections between the forward ends of the draft bars, and a draft link loosely connected with the forward ends of the draft bars and adapted to shift vertically as the carrying structure is vertically shifted while the draft is applied.

10. In a plow, the combination of a frame comprising a supporting structure, a carrying structure, and a connection between the structures for shifting the carrying structure vertically, the supporting structure being adapted to turn laterally with respect to the carrying structure, with a draft bar pivoted to the carrying structure for vertical and horizontal swing, a draft bar pivoted to the supporting structure for vertical swing, a loose connection between the forward ends of the bars, and a draft link loosely connected with the forward ends of the bars and adapted to automatically shift to the vertical center of draft as the carrying structure is vertically shifted while draft is applied.

11. In a plow, the combination of a carrying structure, a supporting structure at the forward end of the carrying structure and pivotally connected thereto for lateral turn, and a connection between the structures for vertically shifting the carrying structure with respect to the supporting structure, with a draft bar pivoted to the carrying structure for vertical and horizontal swing, a draft bar pivoted to the supporting structure for vertical swing, a vertical bar, pivotal connections between the ends of the vertical bar and the forward ends of the respective draft bars, and a link loosely connected with the vertical bar adapted to shift vertically with respect to the latter bar as the carrying structure is vertically shifted.

12. In a plow, the combination of a carrying structure, a supporting structure at the forward end of the carrying structure pivotally connected therewith for horizontal turn, and a connection between the structures for vertically shifting the carrying structure with respect to the supporting structure, with a draft bar pivoted to the carrying structure for vertical and horizontal swing, a draft bar pivoted to the supporting structure for vertical swing, a vertical bar curved forwardly intermediate its ends and pivoted at its ends to the forward ends of the respective draft bars, and a draft link loosely encircling the vertical bar and adapted to automatically shift to the vertical line of draft as the carrying structure is vertically shifted.

13. In a plow, the combination of a carrying structure, a supporting structure at the forward end of the carrying structure and pivotally connected therewith for horizontal turn, and a connection between the structures for vertically shifting the carrying structure with respect to the supporting structure, with draft bars pivotally connected with the respective structures for vertical swing, a vertical bar, a differential pivotal connection between the bars and the vertical bar whereby the bars are self supporting, and a link connected with the vertical bar for vertical shift with respect thereto.

14. In a plow, the combination of a carrying structure, a supporting structure at the forward end thereof and pivotally connected therewith for horizontal turn, and a connection between the structures for vertically shifting the carrying structure with respect to the supporting structure, with draft bars pivotally connected with the respective structures for vertical swing, one of said bars being longer than the other, a vertical bar, pivotal connections between the ends of the bar and the forward ends of the draft bars, and a draft link loosely connected with the vertical bar and adapted to automatically shift to the line of draft as the carrying structure is vertically shifted.

15. In a plow, the combination of a carrying structure, a supporting structure at the forward end of the carrying structure and pivotally connected therewith for lateral turn, and a connection between the structures for shifting the carrying structure vertically with respect to the supporting structure, rigid draft bars connected with the carrying structure behind the pivotal connection and projecting forwardly thereof at the opposite sides of the pivot, a cross bar pivoted between the forward ends of the rigid bars for longitudinal turn, a draft bar pivoted at its rear end to the cross bar for lateral swing, a pair of draft bars pivoted to the supporting structure at points spaced from the transverse center thereof and converging at their forward ends, one of the structure connections being in advance of the other structure connection, a vertical bar shorter than the vertical space between the rear of the draft bars, a pivotal connection of the upper bar with the upper end of the vertical bar, and a pivotal connection between the converging ends of the lower bars with the lower end of the vertical bar, and a draft link loosely connected with the vertical bar and adapted to automatically shift to the line of draft as the carrying structure is shifted.

16. In a plow, the combination of a carrying structure, a supporting structure, and a connection between the two structures for vertically shifting the carrying structure with respect to the supporting structure, draft bars pivotally connected at their rear ends with the respective structures, and pivotal connections between the forward ends of the draft bars whereby, as the carrying structure is vertically shifted the draft bars will automatically adjust themselves to the changed relations of the two structures.

17. In a plow, the combination of a carrying structure, a supporting structure, and a connection between the structures for vertically shifting the carrying structure with respect to the supporting structure, whereby the line of draft is changed, with a draft link having pivotal connections with the respective structures and adapted to automatically shift to the true line of draft as the carrying structure is vertically shifted.

18. In a plow, the combination of a frame, with a pair of vertically spaced draft bars, means for attaching the rear ends of the bars to the front of the frame at vertically spaced points, a draft link, means for connecting the forward ends of the draft bars to the link and means for adjusting the spacing between the rear ends of the bars whereby the link will exert downward pressure upon the machine.

19. In a plow, the combination of a frame, with a pair of vertically spaced longitudinally arranged draft bars, means for attaching the rear ends of the bars to the front of the frame at vertically spaced points, a draft link, and means for connecting the forward ends of the draft bars to the link whereby the link will be automatically shifted to exert upward pull upon the machine.

20. In a plow, the combination of a frame, with a pair of vertically spaced longitudinally arranged draft bars, means for connecting the rear ends of the bars to the frame at vertically spaced points, a vertical spacing bar between the forward ends of the draft bars having pivotal connections respectively therewith, and a draft ring loosely surrounding the vertical bar, one of the connections being longitudinally adjustable on its draft bar, whereby the ring will automatically shift to one of a plurality of predetermined positions with respect to the vertical bar.

21. In a plow, the combination of a frame, with a pair of vertically spaced longitudinally arranged draft bars, means for connecting the rear ends of the draft bars to the frame at vertically spaced points, a vertical spacing bar pivotally connected at its ends to the forward ends of the respective draft bars, a draft member loosely connected with the vertical bar and normally adapted to find the true line of draft when draft is applied, and means for longitudinally shifting one end of the vertical bar whereby the draft member will automatically shift out of the true line of draft.

22. In a plow, the combination of a frame, with a pair of vertically spaced longitudinally arranged draft bars, means for connecting the rear ends of the bars to the frame at vertically spaced points, a vertical bar having connections at its ends with the forward ends of the respective draft bars, a draft member loosely connected with the vertical bar, and means for longitudinally adjusting one of the connections whereby the draft member will automatically find the true line of draft above or below said line as the connection is shifted forward or backwardly.

23. In a plow, the combination of a frame, with a draft bar, means for connecting the draft bar to the frame, a vertical bar connected to the forward end of the draft bar normally standing in vertical position, a draft member loosely connected to the vertical bar and adapted to normally pull at the vertical center of the vertical bar, means for adjusting the vertical bar out of the vertical whereby the draft member will pull out of said vertical center, and means for holding the vertical bar in its adjusted positions.

24. In a plow, the combination of a frame, a draft bar, means for connecting the draft bar to the frame, a vertical bar connected to the forward end of the draft bar and normally standing in a vertical position, a draft member loosely connected to the vertical bar and adapted to normally pull on the true line of draft, means for adjusting the vertical bar out of the vertical whereby the draft member will automatically shift to pull out of the true line of draft, and means for holding the vertical bar in shifted positions.

WILLIAM WALLACE CAMERON.

Copies of this patent may be obtained for five cents each, by addressing the "Commissioner of Patents, Washington, D. C."